United States Patent
Okubo et al.

(10) Patent No.: US 7,832,198 B2
(45) Date of Patent: Nov. 16, 2010

(54) SYSTEM AND METHOD FOR CONTROLLING AN OPERATING TEMPERATURE OF A CATALYST OF A VEHICLE EXHAUST SYSTEM

(75) Inventors: Shunsuke Okubo, Belleville, MI (US); Ming Kuang, Canton, MI (US); Kenneth Frederick, Dearborn, MI (US); Matthew Smith, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 877 days.

(21) Appl. No.: 11/566,876

(22) Filed: Dec. 5, 2006

(65) Prior Publication Data
US 2008/0133114 A1    Jun. 5, 2008

(51) Int. Cl.
*F01N 3/00* (2006.01)
(52) U.S. Cl. .............. 60/286; 60/285; 60/299; 123/568.21; 123/672; 701/108
(58) Field of Classification Search ........ 60/285, 60/286, 295; 701/101–103, 114; 180/65.23–65.29; 903/905, 907
See application file for complete search history.

(56) References Cited

U.S. PATENT DOCUMENTS

| | | | |
|---|---|---|---|
| 6,057,605 A | 5/2000 | Bourne et al. | |
| 6,330,498 B2 | 12/2001 | Tamagawa et al. | |
| 6,367,570 B1 | 4/2002 | Long, III et al. | |
| 6,450,274 B1 * | 9/2002 | Konno et al. ............. | 180/65.26 |
| 6,657,315 B1 | 12/2003 | Peters et al. | |
| 6,856,034 B2 | 2/2005 | Peters et al. | |
| 7,007,460 B2 | 3/2006 | Frieden et al. | |
| 7,456,509 B2 * | 11/2008 | Gray, Jr. ................... | 290/40 C |
| 2001/0037642 A1 | 11/2001 | Uchida | |
| 2004/0128981 A1 | 7/2004 | Moore et al. | |
| 2005/0120709 A1 * | 6/2005 | Ichise et al. ................ | 60/285 |
| 2005/0216176 A1 * | 9/2005 | Ichimoto et al. ........... | 701/112 |
| 2006/0021808 A1 * | 2/2006 | McGee et al. .............. | 180/65.2 |

* cited by examiner

*Primary Examiner*—Tom Denion
*Assistant Examiner*—Jesse Bogue
(74) *Attorney, Agent, or Firm*—David B. Kelley; Brooks Kushman P.C.

(57) ABSTRACT

If a demanded power exceeds a predetermined threshold, where the threshold is based on a catalyst temperature, power from a power storage unit is supplied to a wheel.

7 Claims, 8 Drawing Sheets

SYSTEM AND METHOD FOR CONTROLLING AN OPERATING TEMPERATURE OF A CATALYST OF A VEHICLE EXHAUST SYSTEM

BACKGROUND OF THE INVENTION

1. Field of the Invention

The invention relates to systems and methods for controlling an operating temperature of a catalyst of a vehicle exhaust system.

2. Background Discussion

Carbon Monoxide (CO) tailpipe emissions may be difficult to control on some hybrid electric vehicles when the engine power command is large. Such aggressive driving situations expose the exhaust system's catalyst to high exhaust gas temperatures and may cause the engine subsystem controller to activate catalyst over-temperature protection measures, which enrich the air-fuel mixture. On aggressive drive cycles where the wheel power, and therefore the engine power command, is large, rich air-fuel ratios may be required to protect the catalyst. This may cause the engine to produce CO in excess of the catalyst's capability to reform it.

Exhaust gas temperature is generally proportional to engine power. Catalyst temperature may be greater than exhaust temperature due to the exothermic reactions taking place in the catalyst. Engine power above a threshold may lead to catalyst temperatures above desired operating temperatures. This may trigger air-fuel enrichment for catalyst protection, which may lead to unacceptable CO emissions.

SUMMARY OF THE INVENTION

Embodiments of the invention may take the form of a method for controlling an operating temperature of a catalyst of a vehicle exhaust system. The vehicle includes a power storage unit and at least one wheel. The method includes determining if a demanded power exceeds a predetermined threshold power, the threshold power being based on a predetermined catalyst temperature. The method also includes supplying a supplemental power from the power storage unit to the at least one wheel if the demanded power exceeds the threshold power.

Embodiments of the invention may take the form of a method for controlling an operating temperature of a catalyst of a vehicle exhaust system. The vehicle includes a power storage unit and at least one wheel. The method includes determining a temperature of the catalyst without a temperature measurement from the vehicle and supplying a supplemental power from the power storage unit to the at least one wheel if the temperature of the catalyst exceeds a predetermined threshold temperature.

Embodiments of the invention may take the form of a system for controlling an operating temperature of a catalyst of a vehicle exhaust system. The vehicle includes at least one wheel. The system includes a control system arrangement configured to determine if a demanded power exceeds a predetermined threshold power, the threshold power being based on a predetermined catalyst temperature. The system also includes a power storage arrangement configured to supply a supplemental power to the at least one wheel if the demanded power exceeds the threshold power.

DETAILED DESCRIPTION OF EMBODIMENTS OF THE INVENTION

Figure 1:
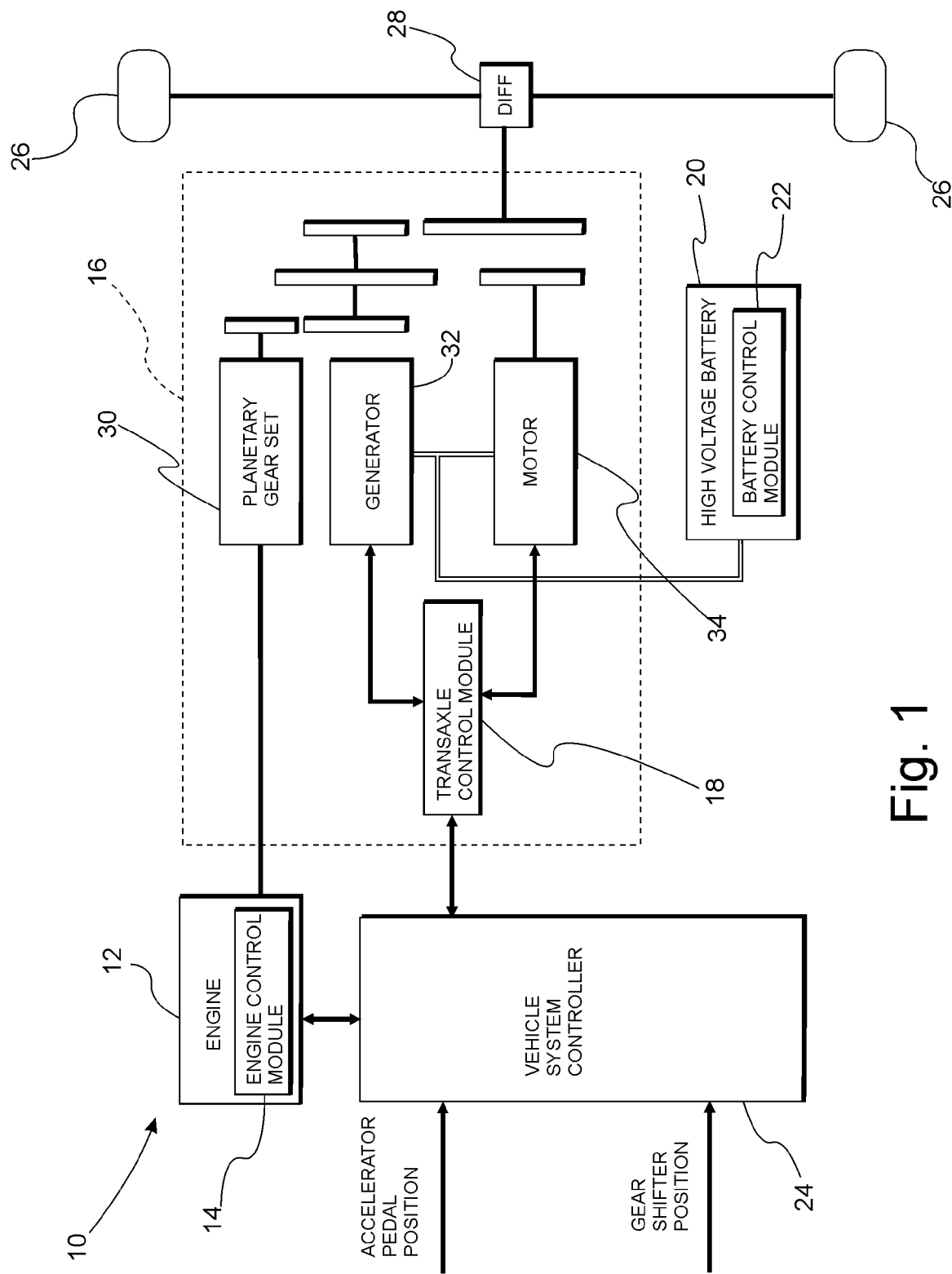
FIG. 1 is a block diagram illustrating a parallel hybrid vehicle system.

FIG. 1 is a block diagram illustrating an embodiment of a parallel hybrid system 10. System 10 includes engine 12, engine control module 14, transaxle 16, transaxle control module 18, power storage unit 20, e.g., high voltage battery, power storage unit control module 22, e.g., battery control module, control module 24, e.g., vehicle system controller, wheels 26, and differential 28 mechanically connecting wheels 26 with transaxle 16.

Transaxle 16 includes planetary gear set 30, generator 32, motor 34, and transaxle control module 18. Control module 24 coordinates the operation of subsystem controllers 14, 18, and 22.

In FIG. 1, control signals are indicated by arrows, electrical energy paths are indicated by double lines, and mechanical energy paths are indicated by single solid lines.

Engine 12 and motor 34 deliver power to wheels 26. Controller 24 coordinates these two power sources to achieve fuel economy, emissions, performance, and driveability targets. Controller 24 computes and issues engine torque, engine speed, and wheel torque commands to engine controller 14 and to transaxle control module 18. These commands are based on the wheel power ($P_{wheel}$), engine power ($P_{engine}$) and battery power ($P_{SOC}$) required to meet a driver's power demand ($P_{driver}$) and maintain a desired state of charge (SOC) of power storage unit 20.

The target battery power is achieved by creating a difference between $P_{wheel}$ and $P_{engine}$. If $P_{wheel}$ is larger than $P_{engine}$, then power storage unit 20 will be discharged. Similarly, if $P_{wheel}$ is less than $P_{engine}$, power storage unit 20 will be charged.

Figure 2:
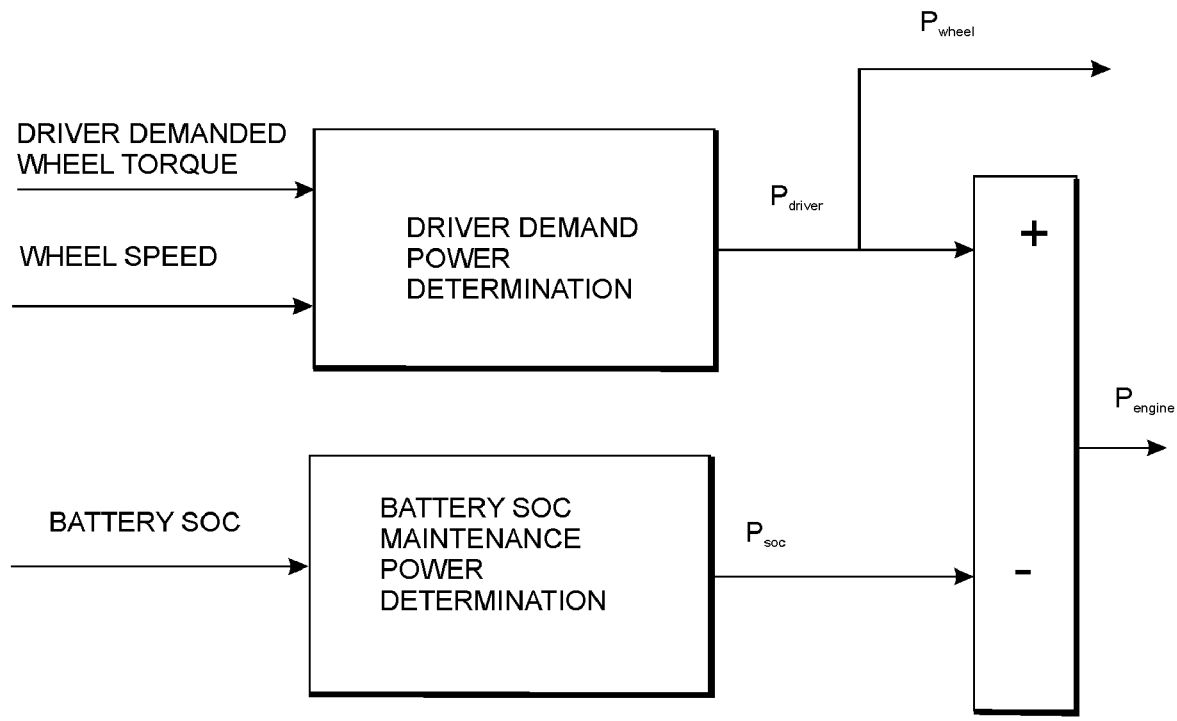
FIG. 2 is a block diagram illustrating a strategy used to supply a driver demanded power and maintain a state of charge of a power storage unit.

FIG. 2 is a block diagram illustrating a portion of a strategy used by controller 24 to calculate the $P_{engine}$, $P_{wheel}$, and $P_{SOC}$ setpoints to meet $P_{driver}$ and maintain $P_{SOC}$. The difference between $P_{wheel}$ and $P_{engine}$ is controlled by the Battery SOC Maintenance Power Determination strategy. The Battery SOC Maintenance Power Determination strategy targets a steady state SOC of, for example, 53%. This target may be driven by battery life, fuel economy, and performance. During normal operation, the SOC is within a few percent of the target value and $P_{SOC}$ is effectively zero.

Figure 3:
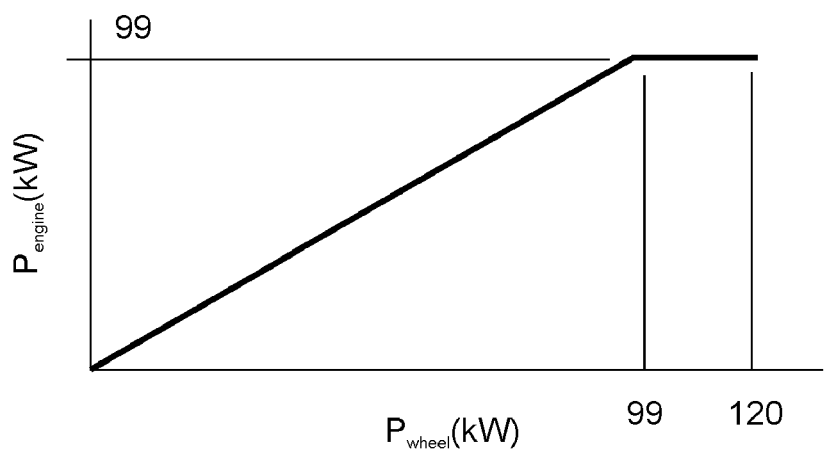
FIG. 3 is an X-Y plot of an example relationship between wheel power and engine power when a state of charge of a power storage unit is balanced.

FIG. 3 is an X-Y plot of $P_{wheel}$ and $P_{engine}$ and shows that $P_{engine}$ is nearly equal to $P_{wheel}$ when $P_{wheel}$ is less than or equal to the engine's maximum power capability. In other words, during normal operation, the engine power setpoint is equal to the wheel power setpoint. Peak system output is achieved by using power storage unit 20 to provide $P_{wheel}$ above the maximum power capability of engine 12.

Figure 4:
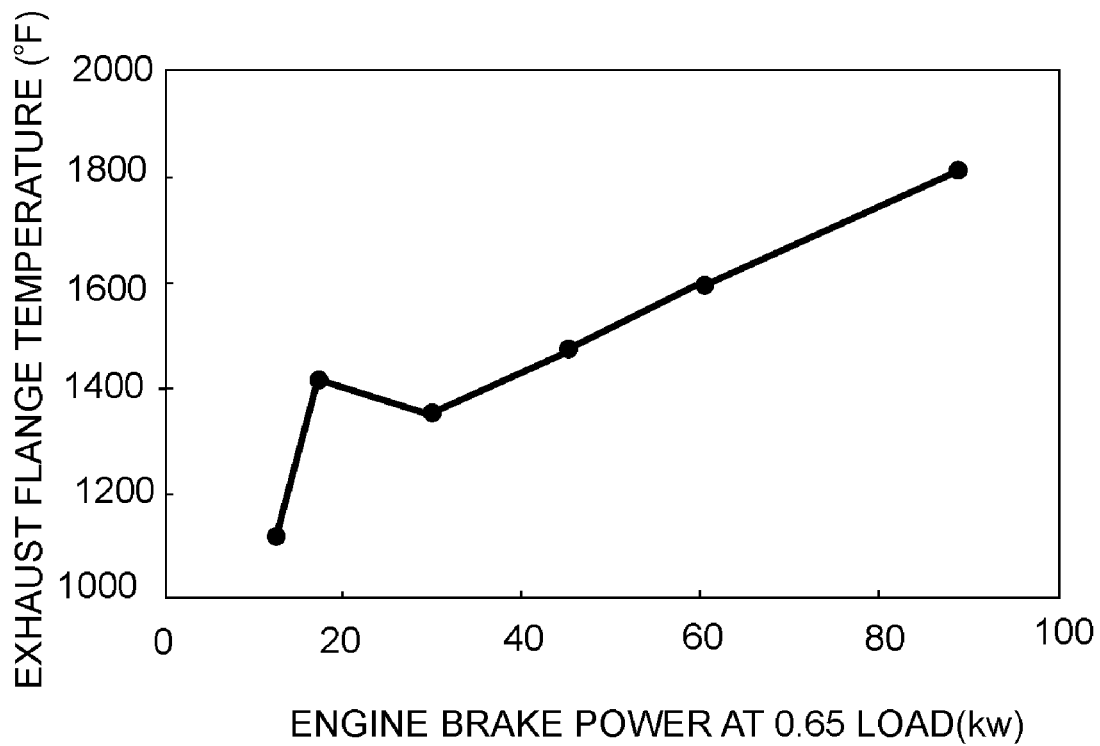
FIG. 4 is an X-Y plot of an example relationship between engine brake power and exhaust flange temperature at a given engine load.

FIG. 4 is an X-Y plot of an example relationship between engine brake power and exhaust flange temperature at 0.65 load, which is near the maximum engine load.

Figure 5:
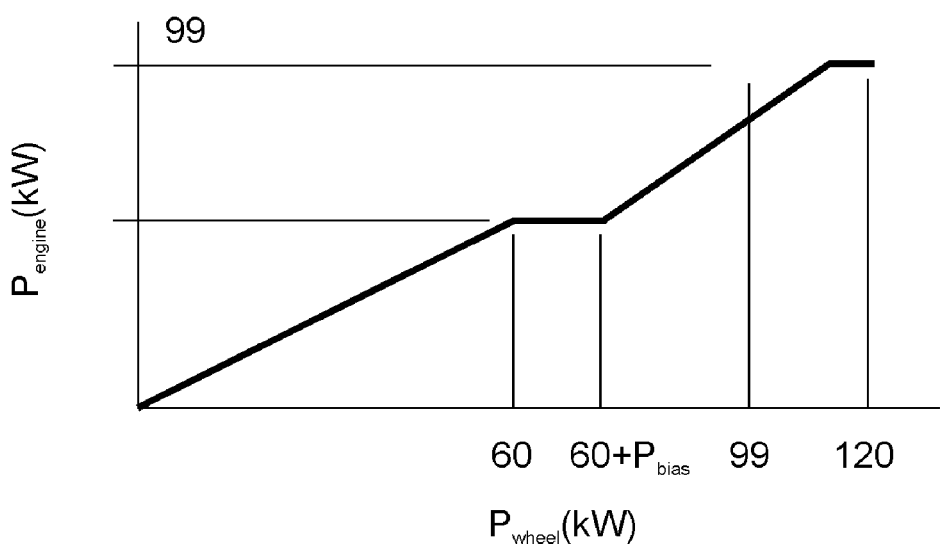
FIG. 5 is an X-Y plot of an example relationship between wheel power and engine power in accordance with an embodiment of invention.

FIGS. 3 and 4 show that if incremental increases in $P_{engine}$ can be minimized for incremental increases in $P_{wheel}$ above, for example, 60 kw, catalyst protection measures can be minimized with a corresponding reduction in CO emissions. This can be accomplished by using power from power storage unit 20, if available, to offset a portion of the engine power ($P_{engine}$) used to meet the driver demanded wheel power ($P_{wheel}$). FIG. 5 is an X-Y plot of $P_{wheel}$ and $P_{engine}$ illustrating this concept.

Figure 6:
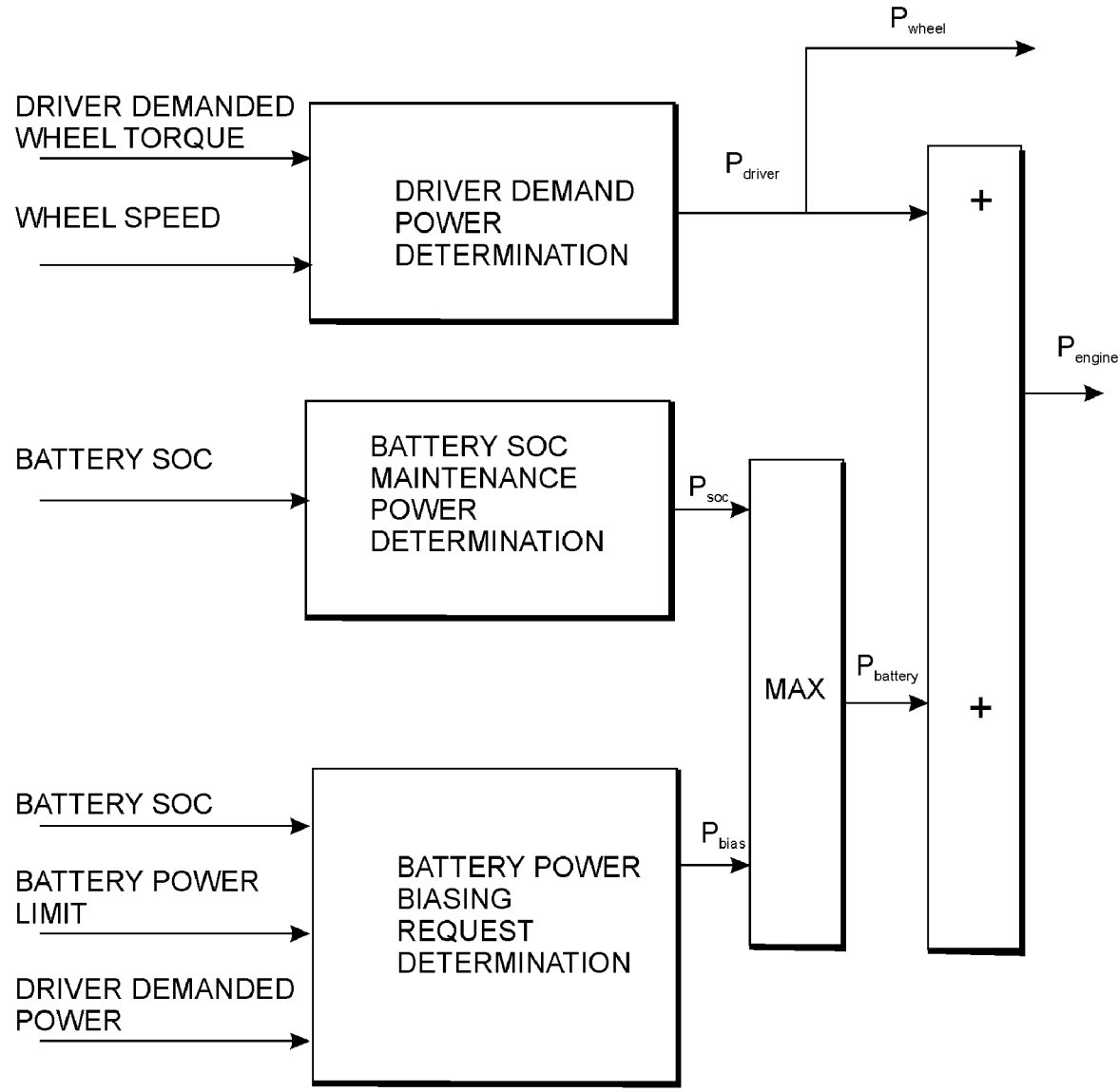
FIG. 6 is a block diagram illustrating a strategy used to minimize incremental increases in engine power above a predetermined threshold.

FIG. 6 is a block diagram illustrating a strategy used by controller 24 to minimize incremental increases in $P_{engine}$ above a predetermined threshold. $P_{battery}$ is the desired battery power which has been arbitrated between the $P_{SOC}$ and $P_{bias}$ requesters where $P_{bias}$ represents the high voltage battery power offset. $P_{engine}$ is reduced via $P_{bias}$. $P_{wheel}$ is maintained by using power from power storage unit 20 to make up for the shortfall. (Negative battery power indicates charging).

Figure 7:
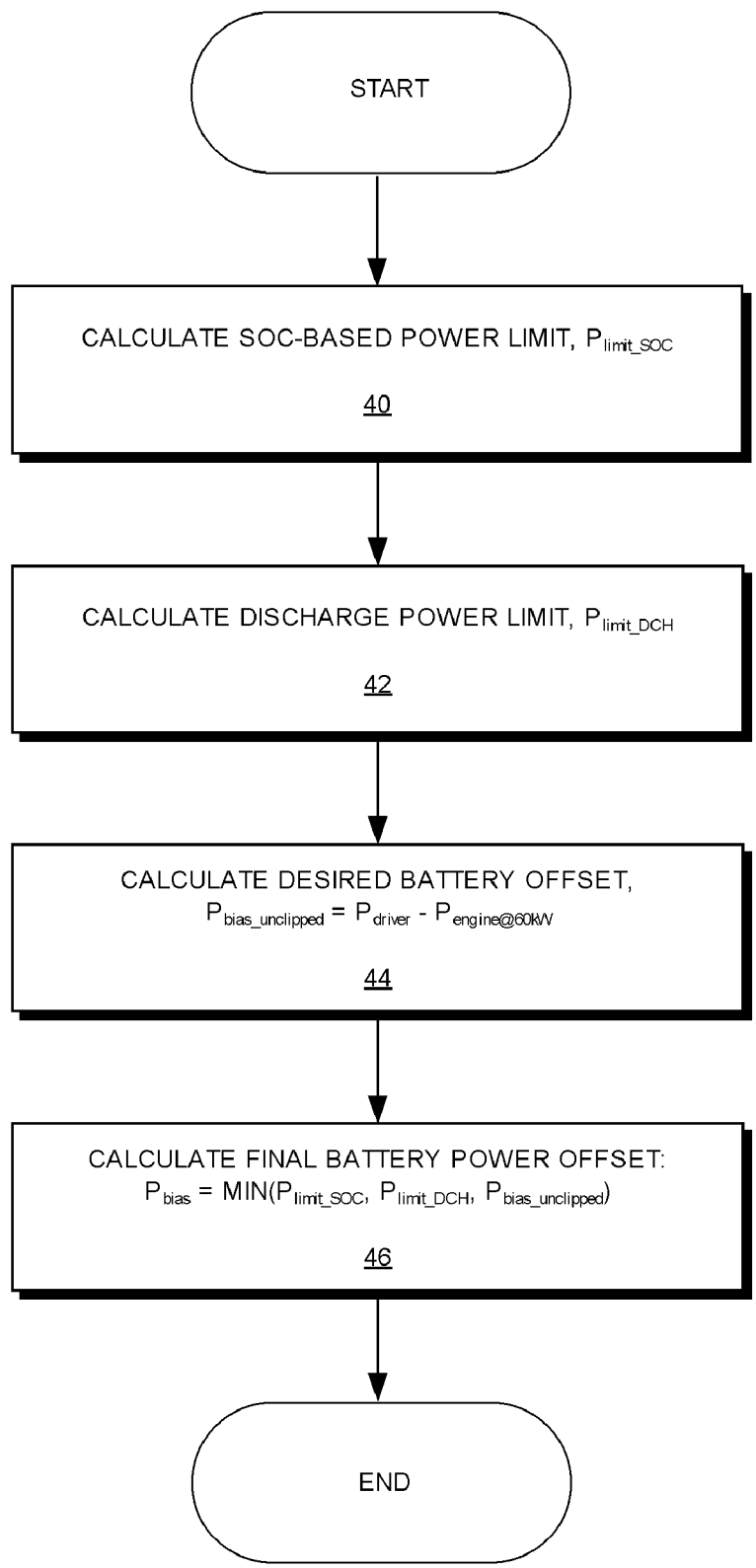
FIG. 7 is a flow chart illustrating the logic used to calculate the $P_{bias}$ output from the strategy shown in FIG. 6.

FIG. 7 is a flow chart illustrating the logic used to calculate the $P_{bias}$ output from the Battery Power Biasing Request Determination strategy shown in FIG. 6. At 40, the SOC-based power limit ($P_{limit\_SOC}$) is calculated. At 42, the discharge power limit-based power limit ($P_{limit\_DCH}$) is calculated. At 44, the desired battery power offset ($P_{bias\_unclipped} = P_{driver} - P_{engine@predetermined\ threshold}$) is calculated. At 46, the final battery power offset ($P_{bias} = MIN(P_{limit\_SOC}, P_{limit\_DCH}, P_{bias\_unclipped})$) is calculated.

The Battery Power Biasing Request Determination strategy first calculates the battery power offset ($P_{bias}$). $P_{bias}$ is set equal to the portion of $P_{wheel}$ command that exceeds the engine power threshold that will result in aggressive catalyst protection measures. This engine power threshold may vary with the powertrain configuration, thus it is a calibratible value. For example, 60 kW may be used. Therefore, $P_{bias} = P_{wheel} - 60$ kW.

The Battery Power Biasing Request Determination strategy next determines the high voltage battery power availability. $P_{bias}$ may be limited by the SOC of power storage unit 20, the reduction in discharge capability depending on the age of power storage unit 20, and the discharge power limit of power storage unit control module 22. $P_{bias}$ may also be limited by other factors such as the temperature of power storage unit 20.

A minimum SOC reserve should be maintained in order to provide a driver with maximum full pedal performance for passing and acceleration maneuvers.

Figure 8:
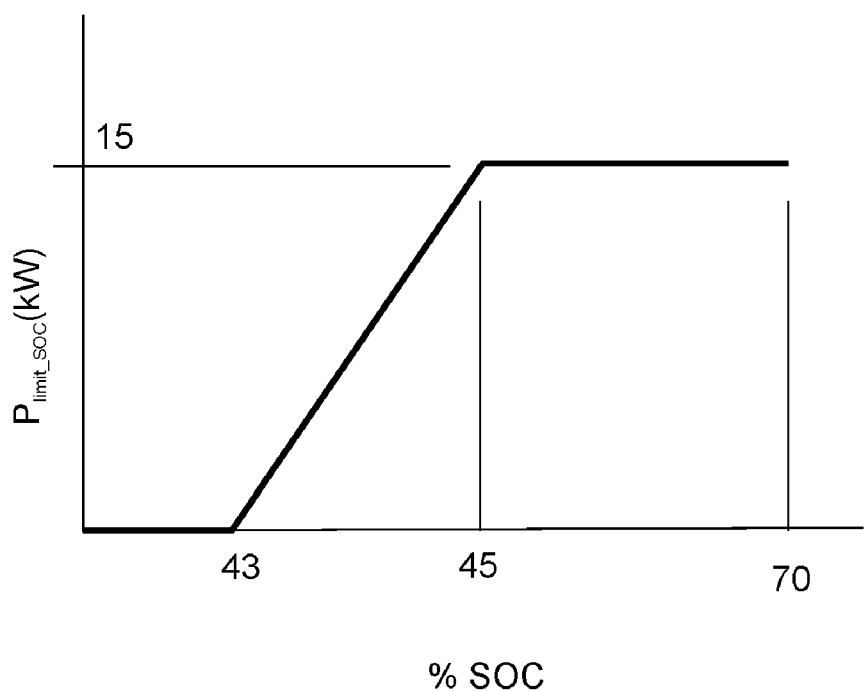
FIG. 8 is an X-Y plot of the values from a calibration table used to limit the power available to an embodiment of the invention as a function of the state of charge of a power storage unit.

A calibration table, as depicted in FIG. 8, limits the battery power available to the Battery Power Biasing Request Determination strategy as a function of the SOC. In the absence of this limit, the Battery Power Biasing Request Determination strategy may drain power storage unit 20 during, for example, prolonged high $P_{driver}$ operation, e.g., prolonged grade climb, leaving no electrical power reserve for full pedal performance should it be requested.

Figure 9:
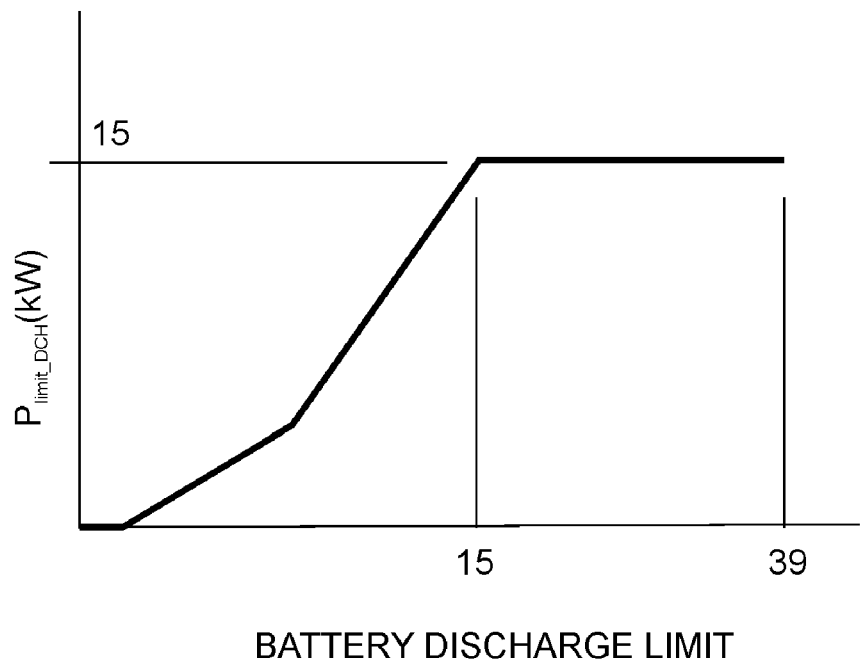
FIG. 9 is an X-Y plot of the values from a calibration table used to limit $P_{bias}$ as a function of the discharge power limit of a power storage unit.

Another calibration table, as depicted in FIG. 9, limits $P_{bias}$ as a function of the discharge power limit of power storage unit 20. Using such a table, a vehicle's emissions performance does not vary with the age of power storage unit 20 and prevents prolonged high power battery discharge.

A new battery may sustain a discharge of 39 kW at 25 C. That same battery at the same temperature, however, after 10 years may only sustain 20 kW. The power available to the vehicle for power biasing is 19 kW lower after 10 years compared to when the battery is new. This may result in different CO emissions performance depending upon the age of high voltage battery 20. In order to prevent this difference, the table of FIG. 9 limits $P_{bias}$ to 15 KW. The 15 kW limit also protects the battery from prolonged high power discharge which may affect battery durability.

$P_{bias}$ is also limited to the discharge power limit as broadcast by battery control module 22 to ensure that the Battery Power Biasing Request Determination strategy does not command a power violation.

The Battery Power Biasing Request Determination strategy then calculates $P_{battery}$ by arbitrating between $P_{bias}$ and $P_{SOC}$. The larger of $P_{bias}$ and $P_{SOC}$ is assigned to the desired battery power $P_{battery}$. This ensures that SOC maintenance will function properly when $P_{driver}$ is small, but power biasing will take precedence when $P_{driver}$ is greater than the predetermined threshold, e.g., 60 kW.

Finally, the Battery Power Biasing Request Determination strategy reduces $P_{engine}$ relative to $P_{wheel}$ by $P_{battery}$. The engine power command set point, $P_{engine}$, is set equal to $P_{driver}$ less $P_{battery}$. Meanwhile, $P_{wheel}$ is set equal to $P_{driver}$. (Note that $P_{engine}$ is less than $P_{wheel}$ by $P_{bias}$ when $P_{bias}$ is greater than $P_{SOC}$.)

Figure 10:
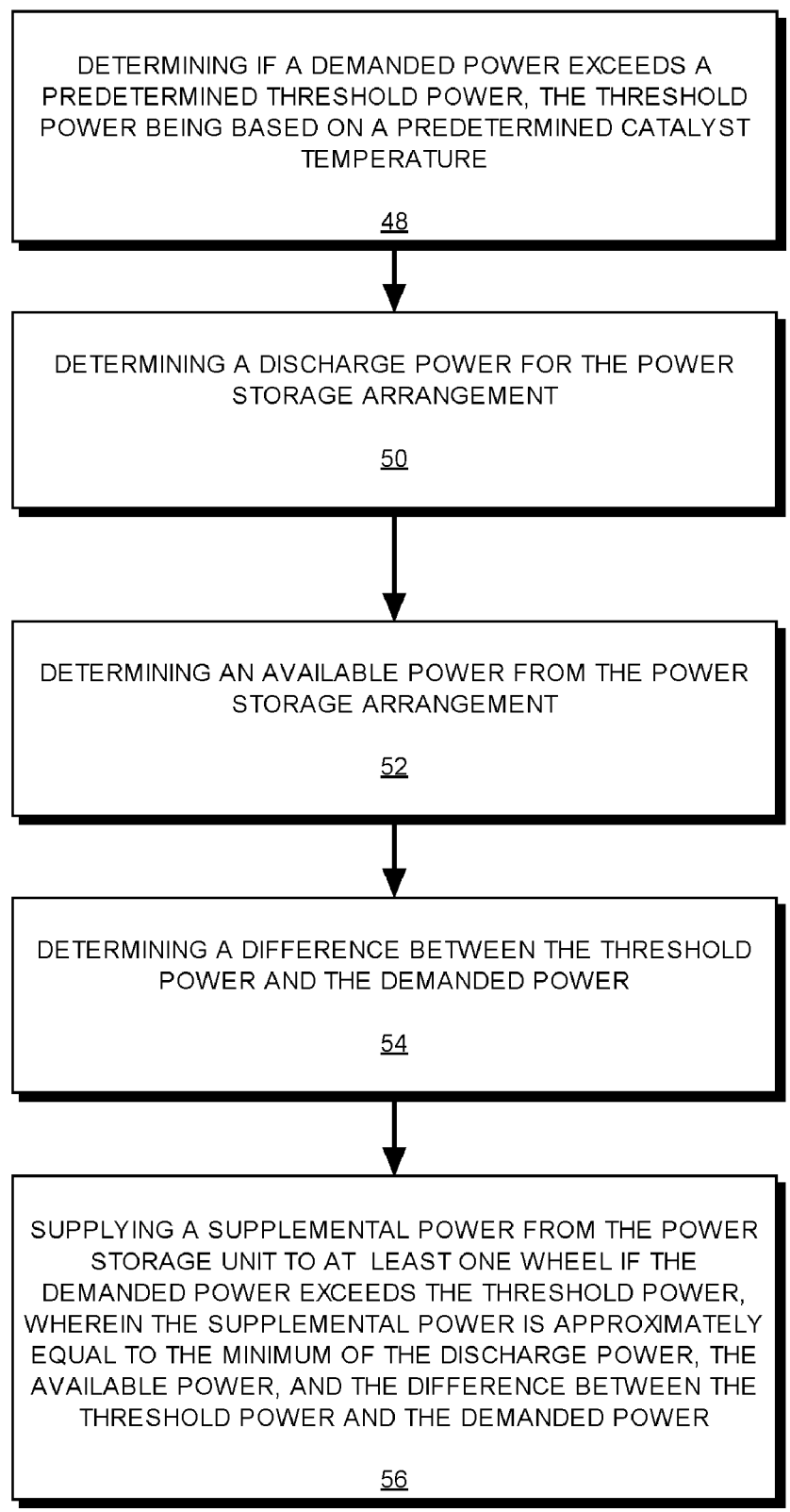
FIG. 10 is a flow chart illustrating a method for controlling an operating temperature of a catalyst of a vehicle exhaust system.

FIG. 10 is a flow chart illustrating a method for controlling an operating temperature of a catalyst of a vehicle exhaust system. At step 48, a determination is made as to whether a demanded power exceeds a predetermined threshold power, the threshold power being based on a predetermined catalyst temperature. At step 50, a discharge power for the power storage arrangement is determined. At step 52, an available power from the power storage arrangement is determined. At step 54, a difference between the threshold power and the demanded power is determined. At step 56, a supplemental power is supplied from the power storage unit to at least one wheel if the demanded power exceeds the threshold power, wherein the supplemental power is approximately equal to the minimum of the discharge power, the available power, and the difference between the threshold power and the demanded power.

Figure 11:
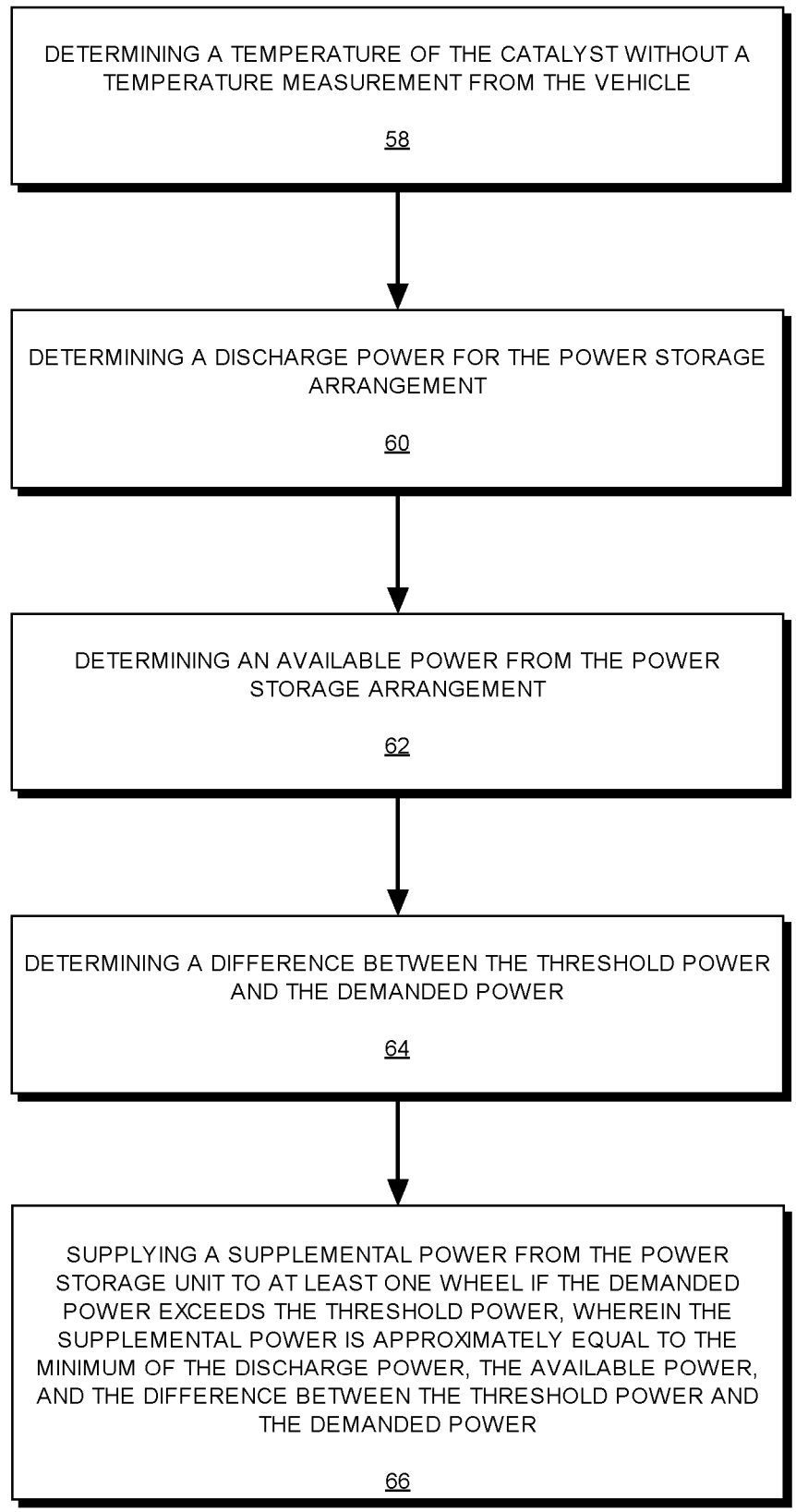
FIG. 11 is a flow chart illustrating a method for controlling an operating temperature of a catalyst of a vehicle exhaust system.

FIG. 11 is a flow chart illustrating a method for controlling an operating temperature of a catalyst of a vehicle exhaust system. At step 58, a temperature of the catalyst is determined without a temperature measurement from the vehicle. At step 60, a discharge power for the power storage arrangement is determined. At step 62, an available power from the power storage arrangement is determined. At step 64, a difference between the threshold power and the demanded power is determined. At step 66, a supplemental power is supplied from the power storage unit to at least one wheel if the demanded power exceeds the threshold power, wherein the supplemental power is approximately equal to the minimum of the discharge power, the available power, and the difference between the threshold power and the demanded power.

The Battery Power Biasing Request Determination strategy may yield, for example, a 5 gram/mile reduction in tailpipe CO emissions on the US06 Supplemental Federal Test Procedure. The Battery Power Biasing Request Determination strategy may also improve noise, vibration, and harshness during aggressive drive cycles. Because the engine power command (Pengine) is reduced, the engine speed is also reduced. This results in lower sound pressure levels in the cabin. Furthermore, small changes to $P_{driver}$ do not drive changes to engine speed when the Battery Power Biasing Request Determination strategy is active.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for controlling an operating temperature of a catalyst of a vehicle exhaust system, the vehicle including a power storage unit and at least one wheel, the method comprising:
   determining if a demanded power exceeds a predetermined threshold power, the threshold power being based on a predetermined catalyst temperature;
   determining a difference between the threshold power and the demanded power if the demanded power exceeds the threshold power; and
   supplying a supplemental power from the power storage unit to the at least one wheel if the demanded power exceeds the threshold power, wherein the supplemental power is approximately equal to the difference between the threshold power and the demanded power.

2. The method of claim 1 further comprising determining a discharge power for the power storage unit, the discharge power being an amount of power that, if discharged from the power storage unit, would permit the power storage unit to substantially achieve an optimum operating condition.

3. The method of claim 2 wherein the optimum operating condition is a predetermined state of charge of the power storage unit.

4. The method of claim 2 wherein the discharge power depends on a condition of the power storage unit.

5. The method of claim 4 wherein the condition includes at least one of a state of charge, a temperature, and an age.

6. The method of claim 1 further comprising determining an available power from the power storage unit, the available power being that amount of power stored by the power storage unit.

7. A system for controlling an operating temperature of a catalyst of a vehicle exhaust system, the vehicle including at least one wheel, the system comprising:
   a control system configured to determine if a demanded power exceeds a predetermined threshold power, the threshold power being based on a predetermined catalyst temperature; and
   a power storage unit configured to supply a supplemental power to the at least one wheel if the demanded power exceeds the threshold power, wherein the control system is further configured to (i) determine a discharge power for the power storage unit, the discharge power being an amount of power that, if discharged from the power storage unit, would permit the power storage unit to substantially achieve an optimum operating condition, (ii) determine an available power from the power storage unit, the available power being that amount of power stored by the power storage unit, and (iii) determine a difference between the threshold power and the demanded power if the demanded power exceeds the threshold power, and wherein the supplemental power is approximately equal to the minimum of the discharge power, the available power, and the difference between the threshold power and the demanded power.

* * * * *